G. S. LEWIS.
ART OF MANUFACTURING FRONT FORKS OF CYCLES.
APPLICATION FILED OCT. 4, 1920.
1,403,257.
Patented Jan. 10, 1922.
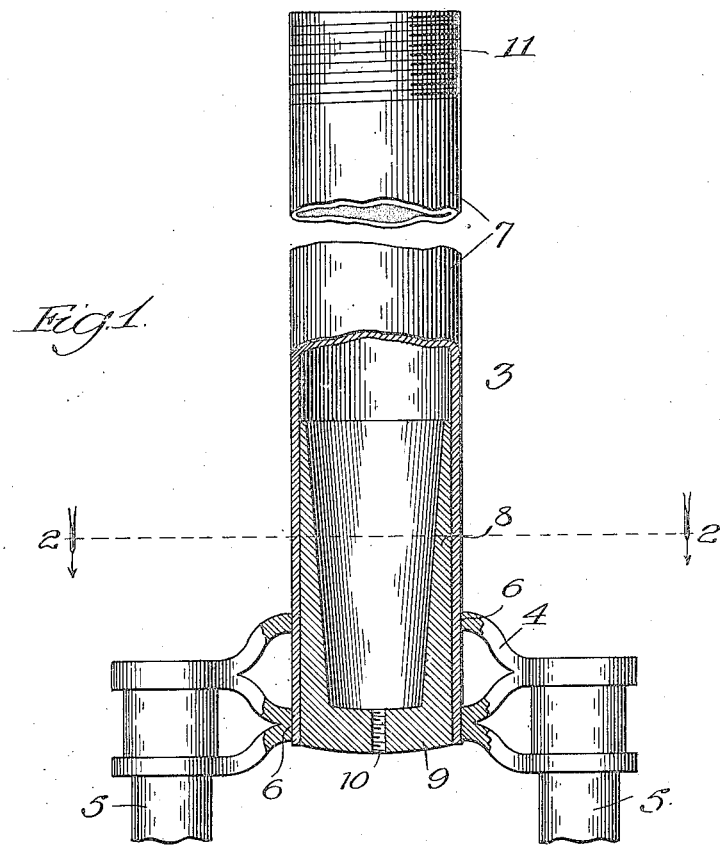
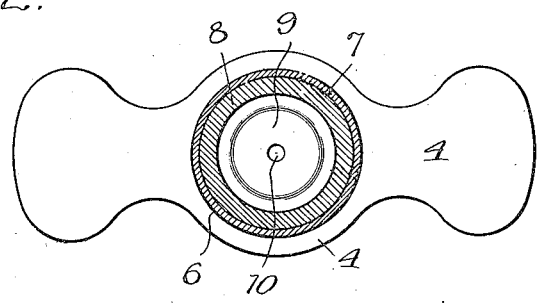
Inventor:
George S. Lewis,
By Dyrenforth, Lee, Chritton & Wiles,
Atty's

UNITED STATES PATENT OFFICE.

GEORGE S. LEWIS, OF OAK PARK, ILLINOIS, ASSIGNOR TO MEAD CYCLE COMPANY.

ART OF MANUFACTURING FRONT FORKS OF CYCLES.

1,403,257.   Specification of Letters Patent.   Patented Jan. 10, 1922.

Application filed October 4, 1920.   Serial No. 414,558.

*To all whom it may concern:*

Be it known that I, GEORGE S. LEWIS, a citizen of the United States, residing at Oak Park, in the county of Cook and State of Illinois, have invented a new and useful Improvement in the Art of Manufacturing Front Forks of Cycles, of which the following is a specification.

My invention relates more particularly to front forks of the type involving a crown portion containing an opening in which the upwardly extending stem of the fork is secured, commonly by brazing it in position.

It is common practice in the manufacture of forks of this type, to provide the stem portion referred to, of a piece of steel tubing, and by reason of the extra stress to which it is subjected adjacent the upper portion of the crown, and in order to economize as much as possible in the use of material, to provide a reenforcing insert which is located within the lower end of the tube and the opening of the crown, this insert being brazed to the tube. This practice, however, presents objections, inasmuch as, while the external diameter of the tubes commonly used, is uniform, the internal diameter of these tubes as provided in practice, is not uniform, there being sufficient variance between the internal diameters of the tubing so that in many cases the reenforcing inserts provided, do not fit the tubes sufficiently tightly to insure the proper brazing of the inserts to the tubes. In fact in practice it is oftentimes found that the greater portion of the insert remains unbrazed to the tube, after the brazing operation, thus causing the fork to lack the desired resistance to distortion and impairment, at this point.

The object of my present invention is to provide a fork crown of the general type above referred to and employing a reenforcing insert, which shall not present the objections as above pointed out, thereby insuring proper strength and rigidity of structure.

Referring to the accompanying drawing:—

Figure 1 is a view in elevation of a front fork of a bicycle, produced in accordance with my invention, certain parts of the structure being broken away and a portion thereof being shown in section; and Figure 2, a section taken at the line 2—2 on Fig. 1 and viewed in the direction of the arrows.

The stem portion of the fork is represented at 3, this stem being shown as rising from a fork crown represented at 4 to which the upper ends of the arms 5 of the crown are secured, these arms 5, in accordance with common practice being adapted to receive at their lower ends the axle of the wheel, to be mounted therein. The fork crown 4 is shown as an open-work structure, affording the opening 6 extending therethrough, this being a common form of crown, but it will be understood that the invention may be employed in connection with other constructions of crowns. The stem 3 is formed of a tube 7, shown as cylindrical and preferably of steel, such as is commonly used in structures of this character and a reenforcing insert 8 secured in the lower end of the tube 7, the lower end of the stem thus provided extending into the opening 6 in the crown 4. The reenforcing insert 8, may be of any suitable construction, but preferably of steel, formed, as by drawing it, from a sheet of metal, the shape of this insert being preferably that shown, viz., cylindrical, adapting it to conform to the inner cylindrical surface of the tube 7 and with its wall of decreasing thickness from its lower toward its upper end, its inner surface flaring upwardly and outwardly as shown. The member 8 thus formed presents a lower end 9 closed, except for the threaded opening 10 therein which preferably is provided for receiving a screw (not shown) for holding a mud-guard in place. In the manufacture of the construction the tube 7 is heated, preferably to a cherry red color, to cause it to expand, and the insert 8 then introduced into the lower end of the tube to the position shown in Fig. 1, the tube 7 in cooling shrinking about the member 8 and forming a tight fit between these parts. The stem portion 3 thus formed is then inserted into the opening 6 in the crown 4 to the position shown in Fig. 1, and with the arms 5 of the fork assembled with the crown 4 to the position shown, then subjected to a brazing operation, by plunging the structure into a bath of the desirable molten metal, in accordance with common practice to submerge the joints between the members forming the stem 3 and the joints between the crown and the parts assembled therewith as stated. The threaded opening 10 is then preferably formed in the portion 9 and the upper end of the stem 3 threaded as indicated at 11.

It will be understood from the foregoing that inasmuch as the tube 7, is shrunk upon the member 8 into tight-joint-forming condition, these parts are very effectually brazed to each other to form a rigid structure, it being understood that the member 8 should be of such proportions, as to provide the necessary resistance, adjacent the crown 4, to the stresses to which the stems of forks are subjected at this point, whereby the structure thus provided involves the employment of the minimum amount of metal, for producing a structure presenting the desired resistance to stresses throughout its extent.

While I have illustrated and described a particular embodiment of my invention and have explained a particular way of practicing the invention, I do not wish to be understood as intending to limit it thereto, as various changes, alterations and modifications may be made not only in the structure, but also in the described method, without departing from the spirit of my invention.

What I claim as new and desire to secure by Letters Patent is:

1. In the manufacture of forks for bicycles formed of a fork crown with a stem portion, the improvement which consists in shrinking a tube forming the stem portion, about a reenforcing-insert introduced into one end of the tube, inserting such end of the tube into the crown, and then brazing these parts together.

2. In the manufacture of forks for bicycles formed of a fork crown with a stem portion, the improvement which consists in heating a tube forming the stem portion, introducing a reenforcing insert into the heated end of the tube, inserting such end of the tube into the crown of the fork, and then brazing the parts together.

3. In a bicycle fork, a fork crown, a tube extending at one end into the opening in said crown and brazed therein, and a reenforcing insert in said end of the tube with said tube shrunk about the insert to provide a tight fit of said insert in said tube and brazed in position therein.

4. In a bicycle fork, a fork crown containing an opening therethrough, a tube extending at one end into said opening and brazed therein, and a reenforcing hollow insert secured in said tube and extending into said crown, said insert being provided with a portion extending across its lower end.

5. In a bicycle fork, a fork crown, a tube extending at one end into the opening in said crown and brazed therein, and a reenforcing insert in said end of the tube with said tube shrunk about the insert to provide a tight fit of said insert in said tube and brazed in position therein, the wall of said insert being of decreasing thickness from its lower toward its upper end.

6. In a bicycle fork, a fork crown containing an opening therethrough, a tube extending at one end into said opening and brazed therein, and a reenforcing hollow insert secured in said tube and extending into said crown, said insert being provided with a portion extending across its lower end, the wall of said insert being of decreasing thickness from its lower toward its upper end.

7. In a bicycle fork, a fork crown containing an opening therethrough, a tube extending at one end into said opening and brazed therein, and a reinforcing hollow insert in said end of the tube with said tube shrunk about the insert to provide a tight fit of said insert in said tube and brazed in position therein, said insert being provided with a portion extending across its lower end.

GEORGE S. LEWIS.